United States Patent
Yoo et al.

(10) Patent No.: US 12,160,739 B2
(45) Date of Patent: Dec. 3, 2024

(54) METHOD FOR AUTHENTICATION, USER TERMINAL AND AUTHENTICATION SERVER FOR EXECUTING THE SAME

(71) Applicant: SAMSUNG SDS CO., LTD., Seoul (KR)

(72) Inventors: Byung Kwan Yoo, Seoul (KR); Min Chul Shin, Seoul (KR); Se Myeong On, Seoul (KR); Myung Hee Kim, Seoul (KR); Keum Sik Im, Seoul (KR); Bo Gyu Kim, Seoul (KR); Sang Beom Shin, Seoul (KR); Hae Won Jeong, Seoul (KR); Yong Seek Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 92 days.

(21) Appl. No.: 18/305,579

(22) Filed: Apr. 24, 2023

(65) Prior Publication Data
US 2023/0262458 A1   Aug. 17, 2023

Related U.S. Application Data

(62) Division of application No. 17/346,807, filed on Jun. 14, 2021, now Pat. No. 11,683,686.

(30) Foreign Application Priority Data

Sep. 11, 2020   (KR) .......................... 10-2020-0117140

(51) Int. Cl.
*H04W 12/069*   (2021.01)
*H04M 3/42*      (2006.01)
(Continued)

(52) U.S. Cl.
CPC ..... *H04W 12/069* (2021.01); *H04M 3/42034* (2013.01); *H04W 12/041* (2021.01); *H04M 3/493* (2013.01)

(58) Field of Classification Search
CPC ............. H04W 12/069; H04W 12/041; H04W 12/043; H04W 12/72; H04M 3/42034;
(Continued)

(56) References Cited

U.S. PATENT DOCUMENTS

2016/0134751 A1* 5/2016 Li ..................... H04M 1/27453
                                                      455/415
2017/0011393 A1   1/2017 Hong
(Continued)

FOREIGN PATENT DOCUMENTS

KR   10-1370407 B1    3/2014
KR   10-1451639 B1   10/2014
(Continued)

OTHER PUBLICATIONS

International Search Report for PCT/KR2021/003313 mailed on Jul. 7, 2021.

*Primary Examiner* — Mazda Sabouri
(74) *Attorney, Agent, or Firm* — NSIP Law

(57) ABSTRACT

A method for authentication, a user terminal and an authentication server for executing the same are disclosed. An authentication server according to an embodiment disclosed includes a number receiver that receives a number of a user terminal from a callee who has received a call originated from the user terminal, a device authenticator that determines whether to generate an authentication key based on the number of the user terminal received from the callee and a caller number received from the user terminal, and generates the authentication key when it is determined to generate the authentication key, and an authentication key (Continued)

transmitter that transmits the authentication key to the user terminal.

14 Claims, 16 Drawing Sheets

(51) Int. Cl.
*H04M 3/493* (2006.01)
*H04W 12/041* (2021.01)

(58) Field of Classification Search
CPC ......... H04M 3/493; H04M 2203/6081; H04M 3/42059; H04M 3/42102; H04M 3/382; H04M 3/5235; H04M 2203/6009; H04L 63/062; H04L 63/083; H04L 63/0876
See application file for complete search history.

(56) References Cited

U.S. PATENT DOCUMENTS

2017/0104870 A1* 4/2017 Mandanapu .......... H04M 3/436
2018/0294959 A1* 10/2018 Traynor .............. H04L 65/1076

FOREIGN PATENT DOCUMENTS

| KR | 10-1486544 B1 | 2/2015 |
| KR | 10-2016-0012853 A | 2/2016 |

* cited by examiner

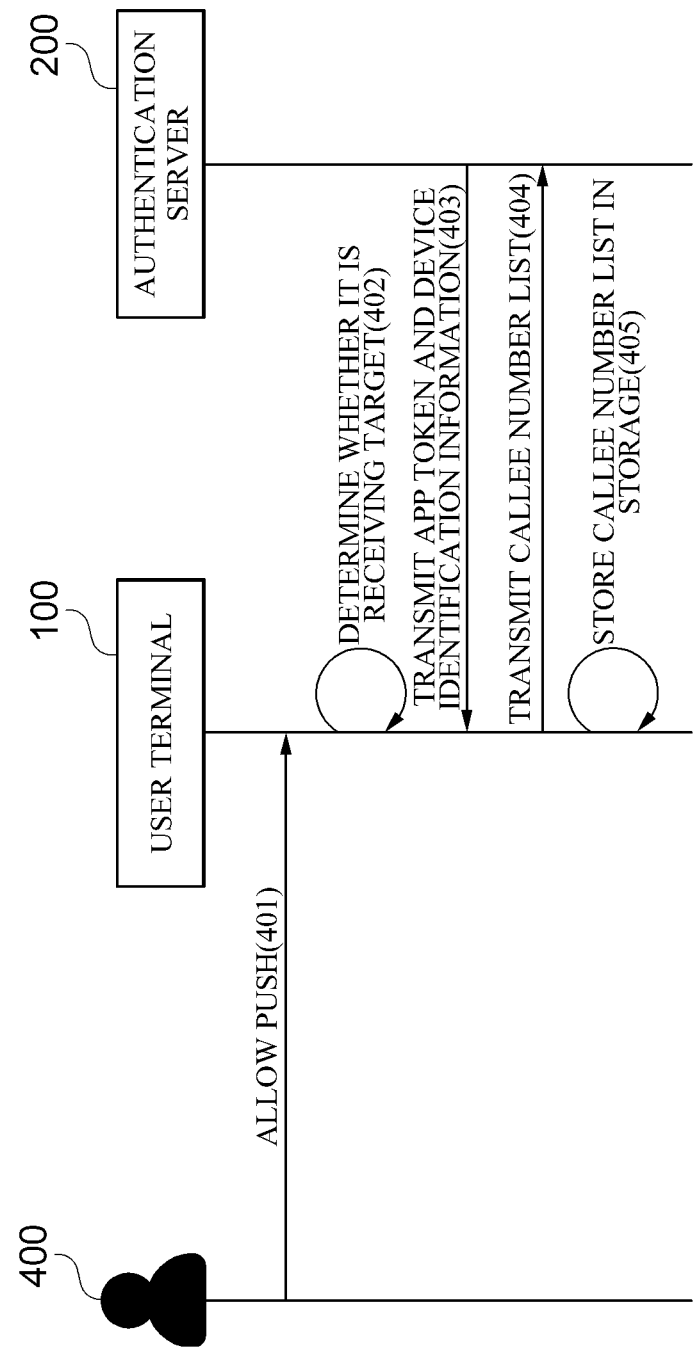

METHOD FOR AUTHENTICATION, USER TERMINAL AND AUTHENTICATION SERVER FOR EXECUTING THE SAME

CROSS-REFERENCE TO RELATED APPLICATION(S)

This application is a Divisional Application of application Ser. No. 17/346,807, filed on Jun. 14, 2021, which claims the benefit under 35 USC § 119(a) of Korean Patent Application No. 10-2020-0117140, filed on Sep. 11, 2020, in the Korean Intellectual Property Office, the entire disclosures of which are incorporated herein by reference for all purposes.

BACKGROUND

1. Field

The disclosed embodiments relate to a technique for performing authentication by generating an authentication key.

2. Description of Related Art

With the development of information technology, people are handling important tasks that require confidentiality of information to be secured using their own terminal devices. For example, more and more people are doing business such as tax payment, account opening, investment, etc. through personal mobile phones without visiting banks in person.

Accordingly, in order to prevent people's information from being leaked to unwanted third parties, a procedure for authenticating whether the terminal device handling the task is a terminal device of a user having legitimate authority is essentially required.

However, in conventional techniques for authenticating the terminal devices, authentication is performed by collecting the numbers of terminal devices to be authenticated in a separate database in advance and comparing the collected numbers with the number of the terminal device that requested authentication.

For this reason, not only is there a limitation in collecting the numbers of terminal devices, which are personal information, but there is also a concern that the numbers of terminal devices may be leaked due to a database being attacked, mistakes in a collection process, or malicious collection for the acquisition of goods.

In addition, as the number of authentication targets increases, the number of pieces of personal information including the numbers of terminal devices to be stored also increases, and thus there is a problem in that a burden such as expanding a storage space of the database or additionally installing a new database occurs.

SUMMARY

The disclosed embodiments are intended to provide means for performing authentication by generating an authentication key.

According to an embodiment, there is provided a user terminal including a storage that stores a callee number list including one or more callee numbers obtained from outside of device, a dialer that originates a call to a originating number input from a user, a device authentication supporter that determines whether to transmit a caller number based on the originating number and the callee number list, and transmits the caller number to an authentication server when it is determined to transmit the caller number, and an authentication key receiver that receives an authentication key from the authentication server and provides the authentication key when the user accesses a service requiring device authentication.

The user terminal may further include a number registration supporter that transmits an app token including identification information of an authentication application previously installed in the device and identification information of the device to the authentication server, and receives the callee number list from the authentication server.

The number registration supporter may determine whether or not the user terminal corresponds to a target for receiving the callee number list, and transmit the app token to the authentication server based on a result of the determination.

The user terminal may further include a number update supporter that receives updates from the authentication server, and updates the callee number list stored in the storage based on the updates.

The number update supporter may receive the updates from the authentication server based on either a push method or a polling method.

The device authentication supporter may determine to transmit the caller number when a same callee number as the originating number exists among one or more callee numbers included in the callee number list.

The device authentication supporter may be included in an authentication application previously installed in the device.

According to another embodiment, there is provided an authentication server including a number receiver that receives a number of a user terminal from a callee who has received a call originated from a user terminal, a device authenticator that determines whether to generate an authentication key based on the number of the user terminal received from the callee and a caller number received from the user terminal, and generates the key authentication key when it is determined to generate the authentication key, and an authentication key transmitter that transmits the authentication key to the user terminal.

The authentication server may further include a number register that receives an app token including identification information of an authentication application previously installed in the user terminal and identification information of the user terminal from the user terminal and transmits a callee number list including one or more callee numbers preset to the user terminal.

When the number register fails to transmit the callee number list, the number register may transmit a processing result informing that transmission of the callee number list to the user terminal has failed, instead of the callee number list.

The authentication server may further include a number updater that transmits updates to the callee number list to the user terminal when an update of the callee number list occurs.

The number updater may transmit the updates to the user terminal based on either a push method or a polling method.

The device authenticator may determine to generate the authentication key when the number of the user terminal received from the callee and the caller number received from the user terminal match.

When the number of the user terminal received from the callee and the caller number received from the user terminal do not match, the device authenticator may call a third-party application related to a service that does not require authentication of the user terminal or cause the user terminal to execute a preset interactive voice response (IVR) scenario provided by the callee.

According to still another embodiment, there is provided a method for authentication performed by a user terminal, the method including storing a callee number list including one or more callee numbers obtained from outside of device, originating a call to a originating number input from a user, determining whether to transmit a caller number based on the originating number and the callee number list, transmitting the caller number to an authentication server when it is determined to transmit the caller number, receiving an authentication key from the authentication serve, and providing the authentication key when the user accesses a service requiring device authentication.

The authentication method performed by the user terminal may further includes transmitting an app token including identification information of an authentication application previously installed in the device and identification information of the device to the authentication server, and receiving the callee number list from the authentication server.

The transmitting the app token and the identification information of the device may include determining whether or not the user terminal corresponds to a target for receiving the callee number list, and transmitting the app token to the authentication server based on a result of the determination.

The authentication method performed by the user terminal may further includes receiving updates from the authentication server, and updating the callee number list stored in the storage based on the updates.

In the receiving the updates, the updates may be received from the authentication server based on either a push method or a polling method.

In the determining, it may be determined to transmit the caller number when a same callee number as the originating number exists among one or more callee numbers included in the callee number list.

The determining and the transmitting the caller number may be performed in an authentication application previously installed in the device.

According to still yet another embodiment, there is provided an authentication method performed by an authentication server, including receiving a number of a user terminal from a callee who has received a call originated from the user terminal, determining whether to generate an authentication key based on the number of the user terminal received from the callee and a caller number received from the user terminal, generating the authentication key when it is determined to generate the authentication key, and transmitting the authentication key to the user terminal.

The authentication method performed by the authentication server may further include receiving an app token including identification information of an authentication application previously installed in the user terminal and identification information of the user terminal from the user terminal, and transmitting a callee number list including one or more callee numbers preset to the user terminal.

In the transmitting the callee number list, when the callee number list fails to be transmitted, a processing result informing that transmission of the callee number list to the user terminal has failed may be transmitted, instead of the callee number list.

The authentication method performed by the authentication server may further include transmitting updates to the callee number list to the user terminal when an update of the callee number list occurs.

In the transmitting the updates, the updates may be transmitted to the user terminal based on either a push method or a polling method.

In the determining, it may be determined to generate the authentication key) when the number of the user terminal received from the callee and the caller number received from the user terminal match.

In the determining, when the number of the user terminal received from the callee and the caller number received from the user terminal do not match, a third-party application related to a service that does not require authentication of the user terminal may be called or the user terminal may be caused to execute a preset interactive voice response (IVR) scenario provided by the callee.

BRIEF DESCRIPTION OF THE DRAWINGS

FIG. 4 is a flowchart illustrating a process of registering a callee number list according to an embodiment.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies may unnecessarily obscure the subject matter of the disclosed embodiments, a detailed description thereof will be omitted. In addition, terms to be described later are terms defined in consideration of functions in the disclosed embodiments, which may vary according to the intention or custom of users or operators. Therefore, the definition should be made based on the content throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some, or combination thereof, and it is not to be construed to exclude the presence or possibility of one or more other features, numbers, steps, actions, elements, parts or combinations thereof, other than those described.

Figure 1:
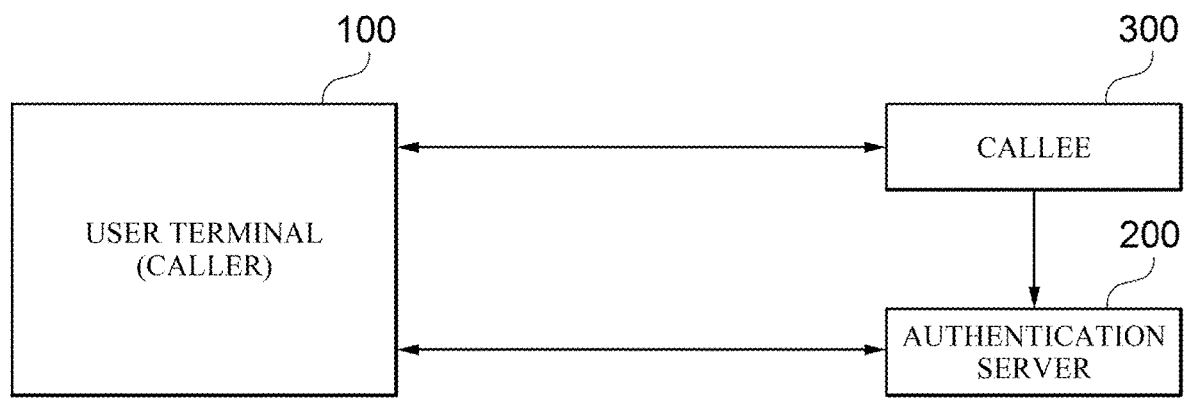
FIG. 1 is a block diagram for describing an authentication system according to an embodiment.

FIG. 1 is a block diagram illustrating an authentication system 1 according to an embodiment.

Referring to FIG. 1, the authentication system 1 according to the embodiment includes a user terminal 100, an authentication server 200, and a callee 300.

The user terminal 100 is a device used to receive an authentication service from the authentication server 200, and may be in the form of, for example, a smartphone, a tablet PC, a smart watch, a smart band, a personal computer, etc. In addition, any device that satisfies the definition described above is interpreted as belonging to the user terminal.

Specifically, the user terminal 100 may receive an authentication service such as execution of various browsers, web viewers, and applications by transmitting information such as a caller number to the authentication server 200, for example, when a dial number input from a user satisfies a specific condition, for example. The user terminal 100 may include, for example, an input device such as a touch screen or a stylus pen to obtain such a dial number from the user.

Meanwhile, the user terminal 100 may originate a call to the callee 300 corresponding to the dial number input from the user based on the dial number.

The authentication server 200 is a server that authenticates the user terminal 100, and may perform authentication using information transmitted from the user terminal 100 and the callee 300.

Specifically, the authentication server 200 may perform authentication for the user terminal 100 by receiving information such as a caller number from the user terminal 100 and receiving the number of the user terminal 100 obtained by using an automatic number identification (ANI) function from the callee 300, who has received the call originated from the user terminal 100.

In addition, when the received information satisfies a specific condition, the authentication server 200 may generate an authentication key and transmit the authentication key to the user terminal 100, and the user of the user terminal 100 may use various services requiring authentication of the user terminal 100 by using the transmitted authentication key.

In the embodiment described above with reference to FIG. 1, series of information exchanged between the user terminal 100, the authentication server 200, and the callee 300 may be transmitted through a communication network. In this case, the communication network may include the Internet, one or more local area networks, wide area networks, cellular networks, mobile networks, other types of networks, or a combination of these networks.

Figure 2A:
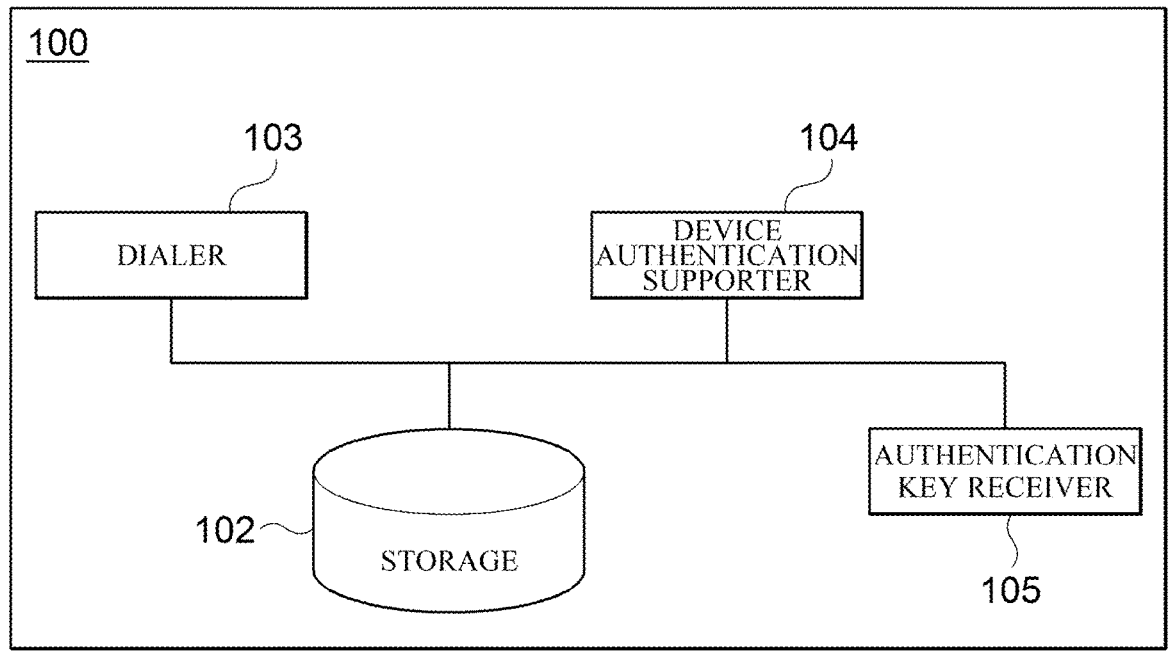
FIG. 2A is a block diagram for describing a user terminal according to an embodiment.

FIG. 2A is a block diagram illustrating the user terminal 100 according to an embodiment.

As illustrated, the user terminal 100 according to the embodiment includes a storage 102, a dialer 103, a device authentication supporter 104, and an authentication key receiver 105.

The storage 102 stores a callee number list including one or more callee numbers obtained from outside of device.

According to an embodiment, the storage 102 may be a storage space provided in the user terminal 100 under the condition of installation of an authentication application, but is not necessarily limited thereto, and may be a storage space that is always provided in the user terminal 100 regardless of the installation/deletion of an authentication application according to an embodiment.

In addition, according to an embodiment, the storage 102 may be a storage space provided by hardware such as ROM, RAM, flash memory, and cache in the user terminal 100, but is not necessarily limited thereto, and may be a storage space provided by an external server using a cloud service according to an embodiment.

In addition, according to an embodiment, the callee number list stored in the storage 102 may be information obtained in advance before a series of processes for authenticating the user terminal 100 are performed, but is not necessarily limited thereto, and may be information obtained as the series of processes are performed.

In addition, the callee number list may be transmitted from the following authentication server 200, but is not necessarily limited thereto, and it should be noted that the callee number list may be transmitted from a device that generates a separate callee number list or a device that mediates the transmission of the callee number list.

The dialer 103 originates a call to the originating number that the user terminal 100 receives from the user.

Specifically, the dialer 103 may be a dedicated dial application provided by the manufacturer of the user terminal 100, but is not limited thereto, and for example, may be a separate dial application arbitrarily installed by the user.

In the following embodiments, a target for receiving a call originated by the dialer 103 is collectively referred to as a 'callee'.

The device authentication supporter 104 determines whether to transmit the caller number based on the originating number to which the dialer 103 originated the call and the callee number list stored in the storage 102 and when it is determined to transmit the caller number, the device authentication supporter 104 determines the user terminal 100 as an authentication key generation target and transmits the caller number to the authentication server 200.

In this case, the 'caller number' means the number of the user terminal 100 itself, and is information separate from the number of the user terminal 100 identified by the callee 300 to be described below.

According to an embodiment, when the same callee number as the originating number to which the dialer 103 originated the call exists, among one or more callee numbers included in the callee number list stored in the storage 102, the device authentication supporter 104 may determine to transmit the caller number and determine the user terminal 100 as the authentication key generation target.

For example, when the dialer 103 originates a call to '02-123-4567', the device authentication supporter 104 may check whether '02-123-4567' exists in the callee number list stored in the storage 102. When it is checked that '02-123-4567' exists, the device authentication supporter 104 may determine the user terminal 100 as an authentication key generation target and transmit a caller number to the authentication server 200.

The authentication key receiver 105 receives an authentication key from the authentication server 200 and provides the authentication key when the user accesses a service requiring device authentication.

For example, the user can access various browsers, web viewers, applications, etc. using the user terminal 100, and as a result, can access various services. In this case, some services require authentication of the user terminal 100 for access. In this case, when the user terminal 100 is determined as the authentication key generation target, the authentication key receiver 105 may receive the authentication key, and may provide the authentication key necessary to access the services described above.

With this configuration, the user may easily receive the authentication key and use a desired service simply by inputting the originating number to the user terminal 100 to originate a call when accessing the service requiring device authentication.

By the interaction between the dialer 103, the device authentication supporter 104, and the authentication key receiver 105 described above and the authentication server 200 to be described below, the user receives the authentication key from the authentication server 200 to the user terminal 100. For convenience of explanation, hereinafter, the corresponding process will be collectively referred to as a 'process of generating an authentication key'.

Meanwhile, according to an embodiment, the authentication application previously installed in the user terminal 100 may include at least some of a number registration supporter 101, the storage 102, the number update supporter 105, and the device authentication supporter 104 described above.

With this configuration, by simply installing the authentication application on the user terminal 100, the user may receive the authentication service according to the embodiments described above by using the storage 102 and the dialer 103 in the user terminal 100 together.

In the illustrated embodiment, respective configurations may have different functions and capabilities in addition to those described below, and may include additional configurations in addition to those described below.

In addition, in one embodiment, the number registration supporter 101, the device authentication supporter 103, and the authentication key receiver 104 may be implemented using one or more physically separated devices, or may be implemented by one or more processors or a combination of one or more processors and software, and unlike the illustrated example, may not be clearly distinguished in a specific operation.

Figure 2B:
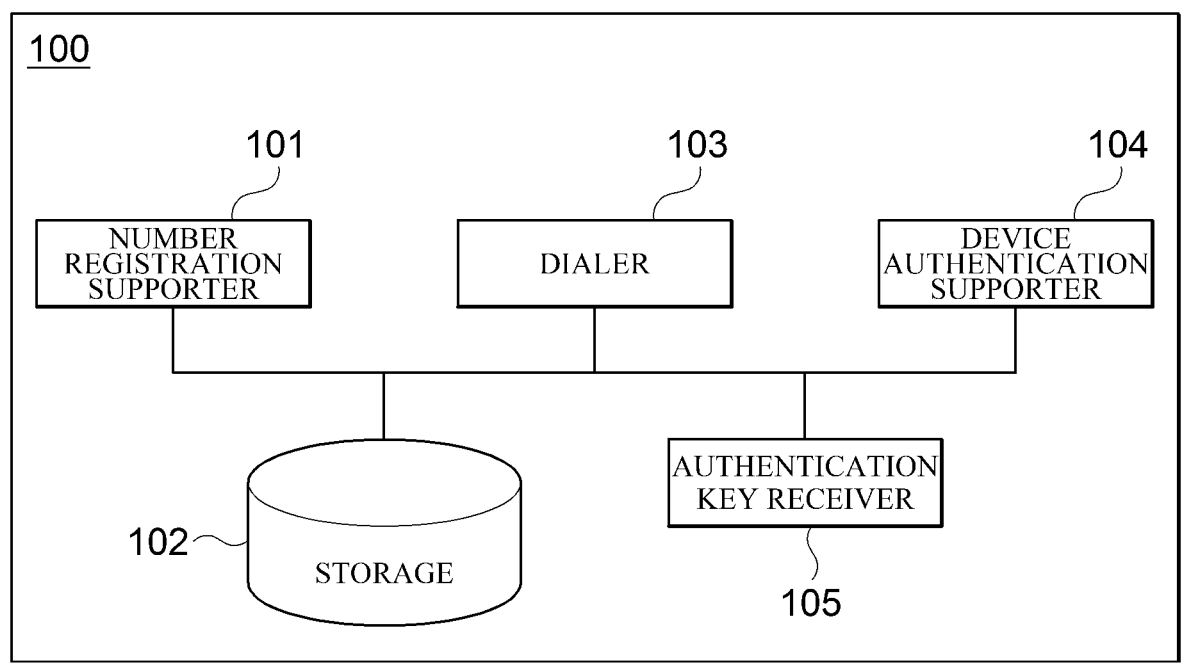
FIG. 2B is a block diagram for describing a user terminal according to an additional embodiment.

FIG. 2B is a block diagram for describing the user terminal 100 according to an additional embodiment.

As illustrated, in addition to the storage 102, the dialer 103, the device authentication supporter 104, the authentication key receiver 105, the user terminal 100 according to the additional embodiment may further include the number registration supporter 101.

The number registration supporter 101 may transmit an app token including identification information of an authentication application previously installed in device and identification information of the device to the authentication server 200, and receive a callee number list including one or more preset callee numbers from the authentication server 200.

Specifically, when the user starts the authentication application for the first time, the user needs to receive a preset callee number list and store the callee number list in the user terminal 100. For convenience of explanation, the corresponding process is hereinafter collectively referred to as a 'registration process'.

According to an embodiment, in the registration process, the number registration supporter 101 may transmit the app token including an application ID (AID) corresponding to a unique key of the authentication application previously installed in the user terminal 100 and information for identifying the user terminal 100 itself to the authentication server 200.

Thereafter, in the registration process, when the authentication server 200 that has received the app token and the device identification information transmits a callee number list, the number registration supporter 101 may receive the callee number list.

According to an embodiment, the number registration supporter 101 may determine whether or not the user terminal 100 corresponds to a target for receiving the callee number list, and transmit the app token to the authentication server 200 based on the determination result.

Specifically, when the callee number list is already stored in the storage 102 in the user terminal 100 or the transmission of the app token itself is not permitted by the user, the number registration supporter 101 may determine that the user terminal 100 does not correspond to a target for receiving the callee number list and may not transmit the app token.

In the illustrated embodiment, respective configurations may have different functions and capabilities in addition to those described below, and may include additional configurations in addition to those described below.

Figure 2C:
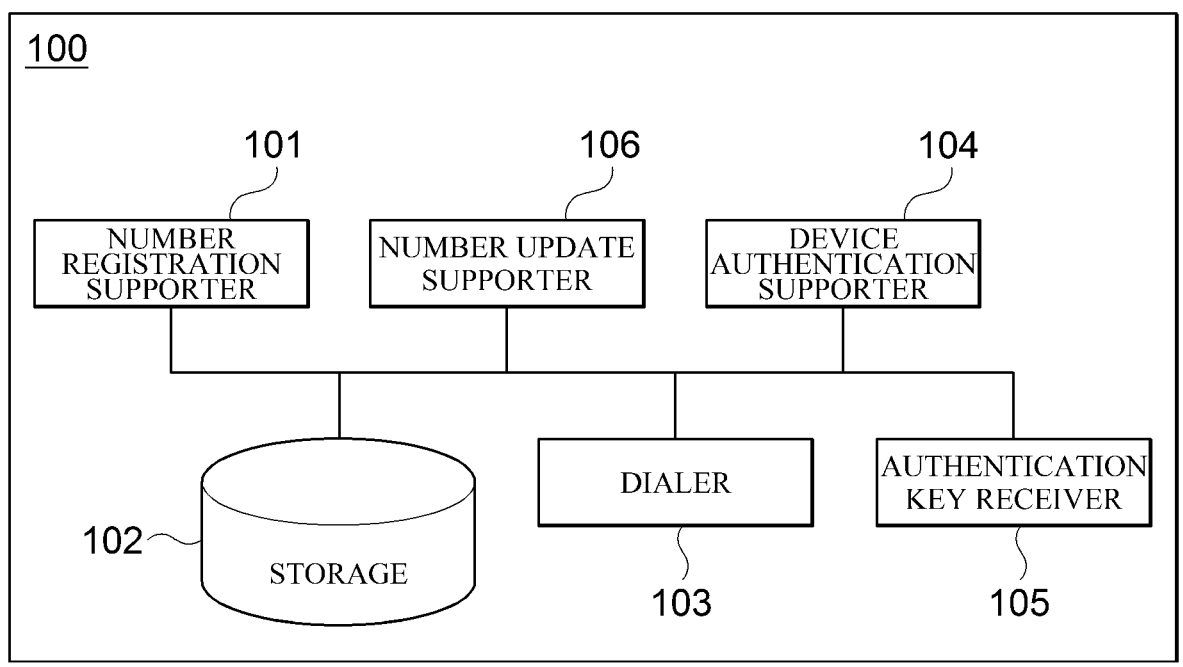
FIG. 2C is a block diagram for describing a user terminal according to an additional embodiment.

FIG. 2C is a block diagram for describing the user terminal 100 according to an additional embodiment.

As illustrated, in addition to the number registration supporter 101, the storage 102, the dialer 103, the device authentication supporter 104, the authentication key receiver 105, the user terminal 100 according to the additional embodiment may further include a number update supporter 106.

According to an embodiment, the number update supporter 106 may receive updates of the callee number list from the authentication server 200, and update the callee number list stored in the storage 102 based on the updates.

Specifically, the user needs to periodically or non-periodically update the callee number list and newly store the callee number list in the user terminal 100. Hereinafter, for convenience of explanation, the corresponding process is collectively referred to as an 'update process'.

That is, when updates for the callee number list occur in the authentication server 200 and the update information is transmitted from the authentication server 200, the number update supporter 106 may receive the transmitted updates and reflect the transmitted updates in the callee number list previously stored in the storage 102.

According to an embodiment, the updates may mean information changed between the callee number list before the update and the callee number list after the update, but may mean information on the entire callee number list after the update depending on an embodiment.

In this case, the number update supporter 106 may receive the entire updated callee number list and store the entire updated callee number list in the form of overwriting the callee number list previously stored in the storage 102.

According to an embodiment, the number update supporter 106 may receive the updates from the authentication server 200 based on either a push method or a polling method. In this regard, description will be made later with reference to FIGS. 5 and 6 below.

In the illustrated embodiment, respective configurations may have different functions and capabilities in addition to those described below, and may include additional configurations in addition to those described below.

Figure 3A:
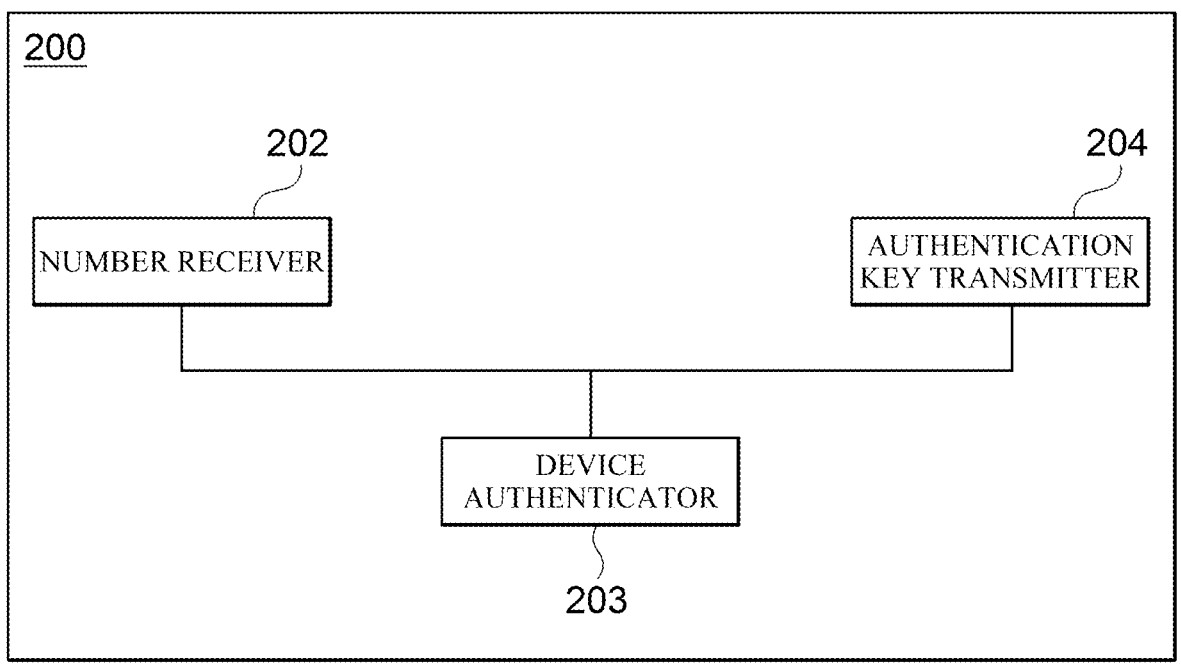
FIG. 3A is a block diagram for describing an authentication server according to an embodiment.

FIG. 3A is a block diagram for describing the authentication server 200 according to an embodiment.

As illustrated, the authentication server 200 according to the embodiment includes a number receiver 202, a device authenticator 203, and an authentication key transmitter 204.

The number receiver 202 receives the number of the user terminal 100 from the callee 300 who has received the call originated from the user terminal 100.

The device authenticator 203 determines whether or not to generate an authentication key based on the number of the user terminal 100 received from the callee and the caller number received from the user terminal 100, and generates the authentication key when it is determined to generate the authentication key.

According to an embodiment, the device authenticator 203 may determine to generate the authentication key when the number of the user terminal 100 received from the callee 300 and the caller number received from the user terminal 100 match.

That is, when the device authenticator 203 determines to generate the authentication key, the authentication server 200 may generate the authentication key.

Meanwhile, according to an embodiment, when the number of the user terminal 100 received from the callee 300 and the caller number received from the user terminal 100 do not match, the device authenticator 203 may call a third-party application related to a service that does not require authentication of the user terminal 100 or cause the user terminal 100 to execute a preset interactive voice response (IVR) scenario provided by the callee 300.

The authentication key transmitter 204 transmits the generated authentication key to the user terminal 100.

According to an embodiment, the authentication key transmitter 204 may include the generated authentication key as a part of a link conforming to a uniform resource locator (URL) protocol and transmit the authentication key to the user terminal 100.

In addition, according to an embodiment, the authentication key transmitter 204 may transmit the generated authentication key to the user terminal 100 in the form of a push alarm.

In the illustrated embodiment, respective configurations may have different functions and capabilities in addition to those described below, and may include additional configurations in addition to those described below.

In addition, in one embodiment, the number receiver 202, the device authenticator 203, and the authentication key transmitter 204 may be implemented using one or more physically separated devices, or may be implemented by one or more processors or a combination of one or more processors and software, and unlike the illustrated example, may not be clearly distinguished in a specific operation.

Figure 3B:
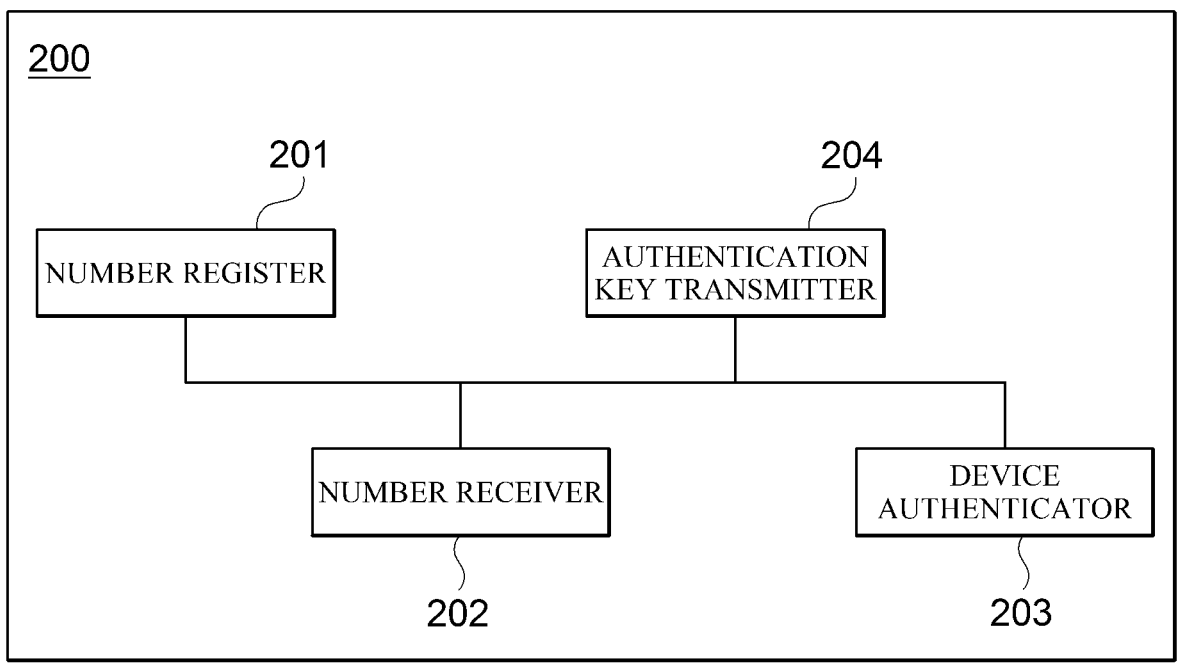
FIG. 3B is a block diagram for describing an authentication server according to an additional embodiment.

FIG. 3B is a block diagram for describing the authentication server 200 according to an additional embodiment.

As illustrated, in addition to the number receiver 202, the device authenticator 203, and the authentication key transmitter 204, the authentication server 200 according to the additional embodiment may further include a number register 201.

The number register 201 may receive the app token including identification information of the authentication application previously installed on the user terminal 100 and identification information of the user terminal 100 from the user terminal 100, and transmit the callee number list including one or more preset callee numbers to the user terminal 100.

Specifically, the number register 201 may identify the user terminal 100 using the received identification information, and identify the authentication application previously installed in the user terminal 100 using the received app token. Thereafter, the number register 201 may transmit the callee number list to the identified user terminal 100.

According to an embodiment, when the number register 201 fails to transmit the callee number list, the number register 201 may transmit a processing result informing that transmission of the callee number list to the user terminal 100 has failed, instead of the callee number list.

For example, the number register 201 may transmit the processing result indicating that the transmission of the callee number list has failed in the form of a push alarm, but is not limited thereto.

In the illustrated embodiment, respective configurations may have different functions and capabilities in addition to those described below, and may include additional configurations in addition to those described below.

Figure 3C:
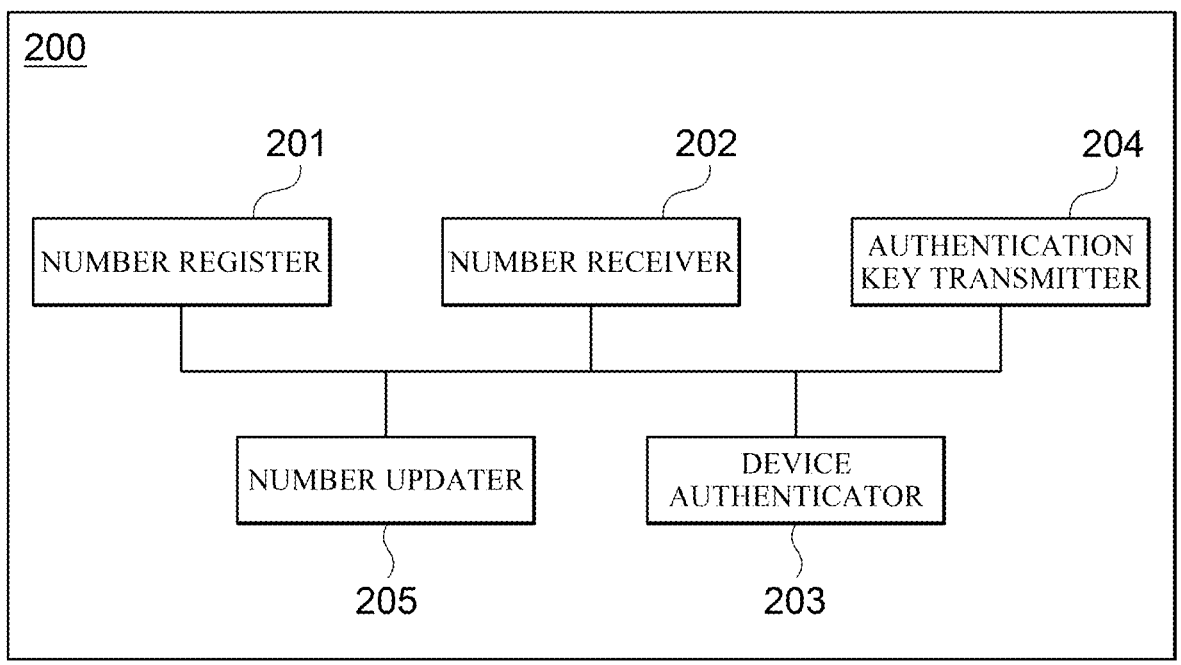
FIG. 3C is a block diagram for describing an authentication server according to an additional embodiment.

FIG. 3C is a block diagram for describing the authentication server 200 according to an additional embodiment.

As illustrated, in addition to the number register 201, the number receiver 202, the device authenticator 203, and the authentication key transmitter 204, the authentication server 200 according to an additional embodiment may further include a number updater 205.

According to an embodiment, the number updater 205 may transmit updates of the callee number list to the user terminal 100.

According to an embodiment, the number updater 205 may transmit a copy of the updates stored in a storage space in the authentication server 200 to the user terminal 100 by accessing the storage space. However, the updates may be stored in a separate storage space located outside the authentication server 200, and in this case, the number updater 205 may access the updates through a communication interface that exchanges a series of signals with the storage space.

According to an embodiment, the number updater 205 may transmit the updates to the user terminal 100 based on either a push method or a polling method. In this regard, description will be made later with reference to FIGS. 5 and 6 below.

Each of the configurations of the authentication server 200 illustrated in FIGS. 3A to 3C described above performs authentication of the user terminal 100 while exchanging series of information with each of the configurations of the user terminal 100 illustrated in FIGS. 2A to 2C.

In the illustrated embodiment, respective configurations may have different functions and capabilities in addition to those described below, and may include additional configurations in addition to those described below.

FIG. 4 is a flowchart illustrating a process of registering the callee number list according to an embodiment.

First, a user 400 permits the user terminal 100 to exchange series of information with the authentication server 200 according to a push method (401).

Thereafter, the user terminal 100 determines whether or not the user terminal 100 itself corresponds to a target for receiving the callee number list from the authentication server 200 (402).

Thereafter, when it is determined that the user terminal 100 corresponds to the target for receiving the callee number list, the user terminal 100 transmits the app token and identification information of device to the authentication server 200 (403).

Thereafter, the authentication server 200, which has received the app token and the identification information of device, identifies the user terminal 100, and transmits the callee number list to the user terminal 100 (404).

Thereafter, the user terminal 100 stores the received callee number list in the storage 102 (405).

Figure 5:
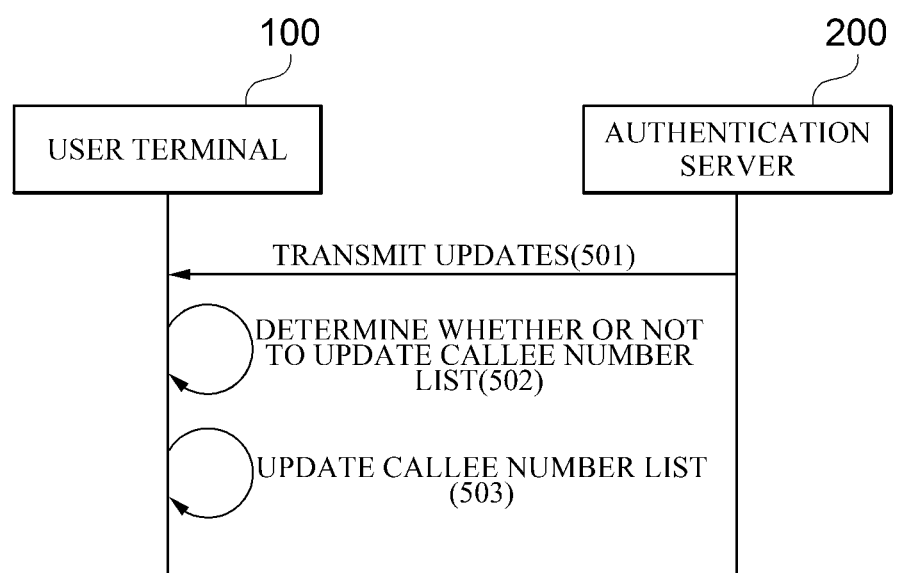
FIG. 5 is a flowchart illustrating a process of updating the callee number list according to an embodiment.

FIG. 5 is a flowchart illustrating a process of updating the callee number list according to an embodiment. Specifically, FIG. 5 illustrates the process of updating the callee number list according to a push method.

First, the authentication server 200 requests to transmit information including updates to the user terminal 100 in a push method, and transmits the updates accordingly (501).

Specifically, since the user terminal 100 has already been permitted on the exchange of information according to the push method in Step 401 described with reference to FIG. 4, in Step 501, the updates may be transmitted without separate permission for the request to transmit information described above.

According to an embodiment, the authentication server 200 may transmit the updates and information on an updated version of the current callee number list together.

Thereafter, the user terminal 100 determines whether or not an update of the callee number list stored in the storage 102 is required based on the received updates (502).

Thereafter, when it is determined that the update of the callee number list is required, the user terminal 100 updates the callee number list based on the received updates (503).

Figure 6:
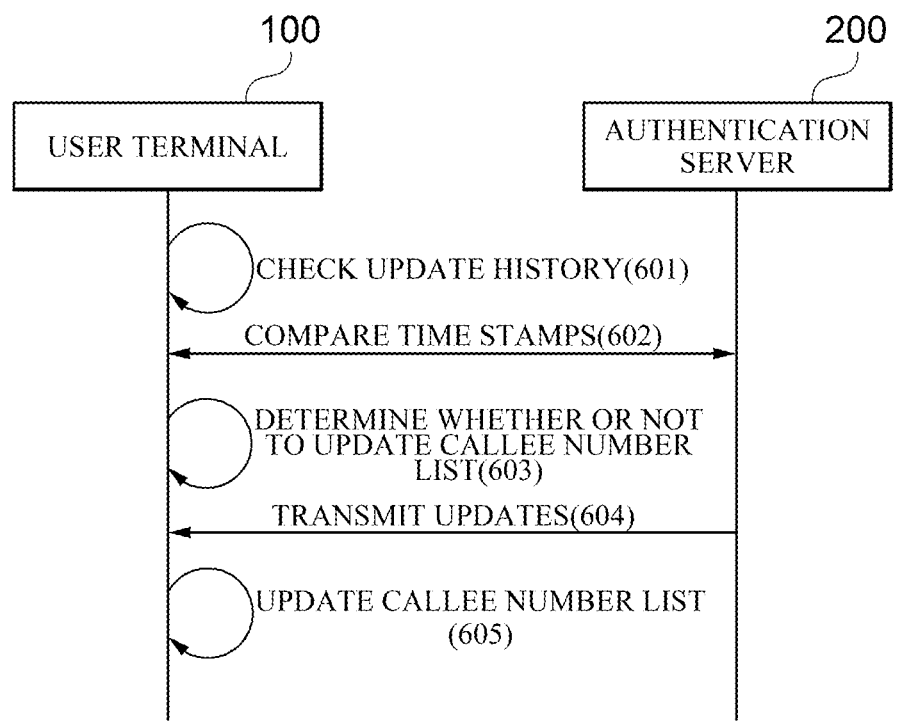
FIG. 6 is a flowchart illustrating a process of updating the callee number list according to another embodiment.

FIG. 6 is a flowchart illustrating a process of updating the callee number list according to another embodiment. Specifically, FIG. 6 illustrates a process of updating the callee number list according to a polling method.

First, the user terminal 100 checks an update history of the callee number list to date (601).

Thereafter, the user terminal 100 and the authentication server 200 compare their respective time stamps (602).

Specifically, information about the time when the callee number list was updated is stored in the time stamp of the user terminal 100, and information about the time of the current authentication server 200 is stored in the time stamp of the authentication server 200.

Accordingly, based on the time of the authentication server 200, it may be determined whether or not a predetermined time has elapsed since the user terminal 100 updates the callee number list.

Thereafter, the user terminal 100 determines whether or not the update of the callee number list in the storage 102 is required according to the result of comparing the timestamps (603).

Specifically, when it is determined that a certain time has elapsed from the time when the recent callee number list was updated, the user terminal 100 may determine that the callee number list needs to be updated.

Thereafter, when the user terminal 100 determines that the callee number list needs to be updated, the authentication server 200 transmits the updates to the user terminal 100 (604).

Thereafter, the user terminal 100 updates the callee number list in the storage 102 based on the received updates (605).

Figure 7:
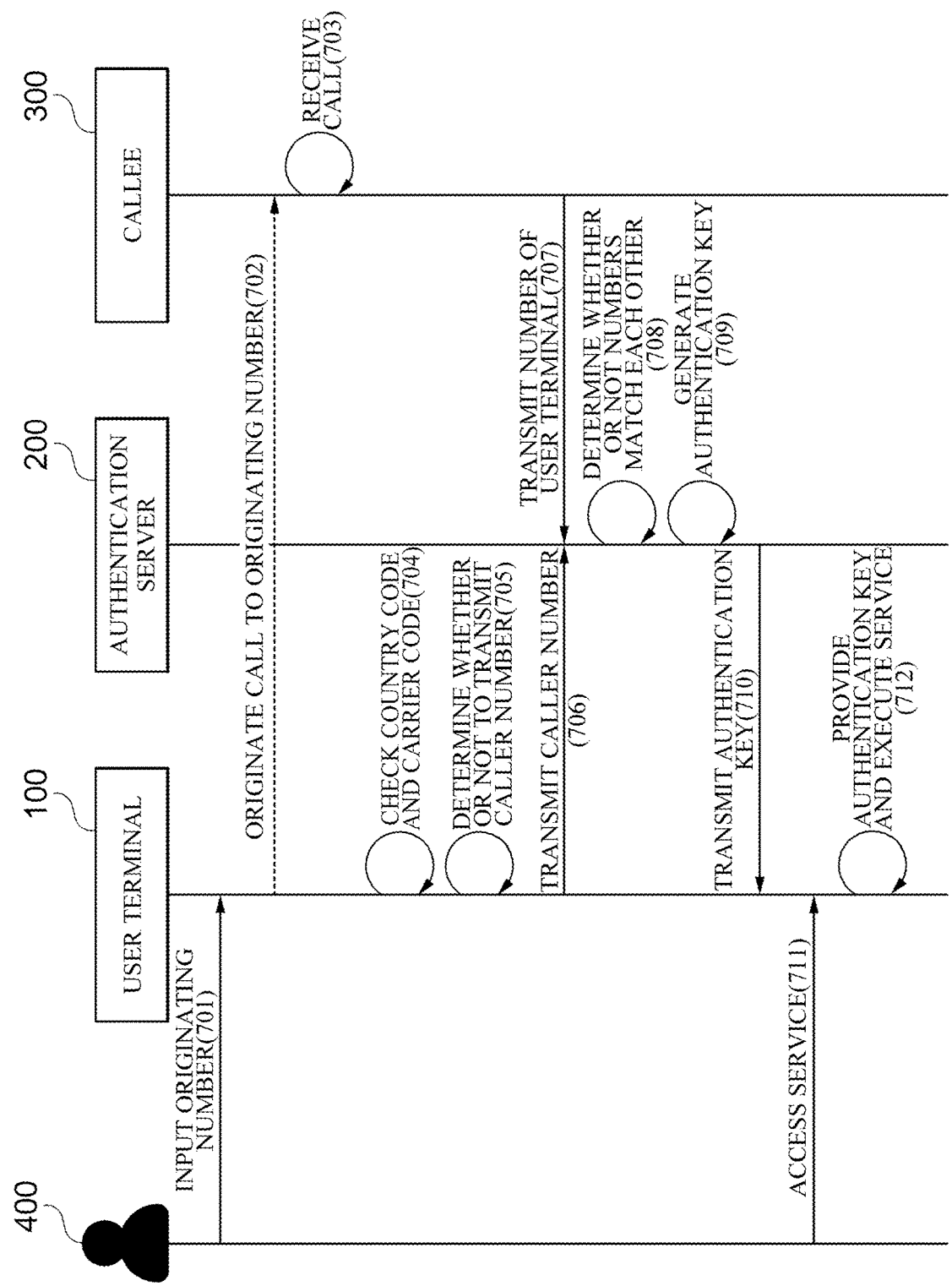
FIG. 7 is a flowchart illustrating a process of generating an authentication key according to an embodiment.

FIG. 7 is a flowchart illustrating a process of generating the authentication key according to an embodiment.

First, the user 400 inputs an originating number into the user terminal 100 (701).

Thereafter, the user terminal 100 originates a call to the received originating number (702).

Thereafter, the callee 300 receiving the call from the user terminal 100 receives the call (703).

Specifically, the callee 300 may identify the number of the user terminal 100 by using the ANI function in Step 703.

Meanwhile, the user terminal 100 checks a country code and a carrier code for the originating number (704).

Thereafter, the user terminal 100 determines whether or not the user terminal 100 is an authentication key generation target by checking whether a number matching the originating number exists in the callee number list in the storage 102, and determines whether or not to transmit the caller number.

Thereafter, when it is determined to transmit the caller number, the user terminal 100 transmits the caller number to the authentication server 200 (706).

Meanwhile, the callee 300 transmits the number of the user terminal 100 identified by the authentication server 200 (707).

Thereafter, the authentication server 200 compares the caller number received from the user terminal 100 with the number of the user terminal 100 received from the callee 300, and determines whether or not the two numbers match each other (708).

Thereafter, when it is determined that the two numbers match each other, the authentication server 200 generates an authentication key (709).

Thereafter, the authentication server 200 transmits the generated authentication key to the user terminal 100 (710).

Thereafter, the user 400 accesses a service requiring device authentication through the user terminal 100 (711).

Thereafter, the user terminal 100 provides the authentication key to execute a service requiring device authentication (712).

In this case, Step 711 may be performed before Step 701, or may be performed before Step 701 and then again after Step 710. It should be noted that this may vary depending on whether or not access to the service is made again after the authentication key is generated.

Figure 8:
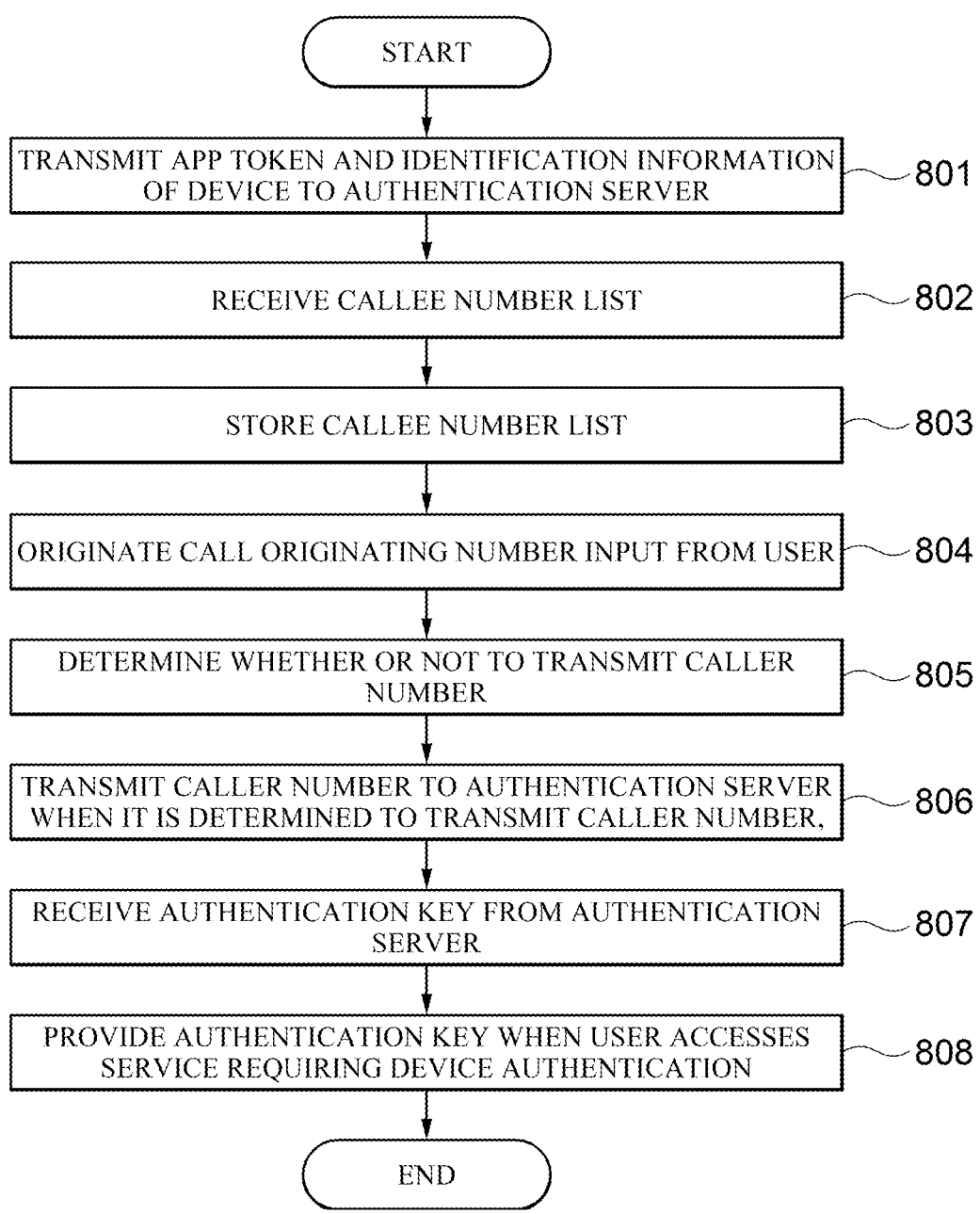
FIG. 8 is a flowchart for describing an authentication method performed by a user terminal according to an embodiment.

FIG. 8 is a flowchart illustrating an authentication method performed by the user terminal according to an embodiment.

The authentication method illustrated in FIG. 8 may be performed, for example, by the user terminal 100 described above.

First, the user terminal 100 transmits an app token including identification information of a previously installed authentication application and identification information of device to the authentication server (801).

Thereafter, the user terminal 100 receives the callee number list including one or more preset callee numbers from the authentication server 200 (802).

Thereafter, the user terminal 100 stores the callee number list (803).

Thereafter, the user terminal 100 originates a call to the originating number input from the user (804).

Thereafter, the user terminal 100 determines whether or not to transmit the caller number based on the originating number and the callee number list (805).

Thereafter, when it is determined to transmit the caller number, the user terminal 100 transmits the caller number to the authentication server 200 (806).

Thereafter, the user terminal 100 receives the authentication key from the authentication server 200 (807).

Thereafter, the user terminal 100 provides the authentication key when the user accesses a service requiring device authentication (808).

Figure 9:
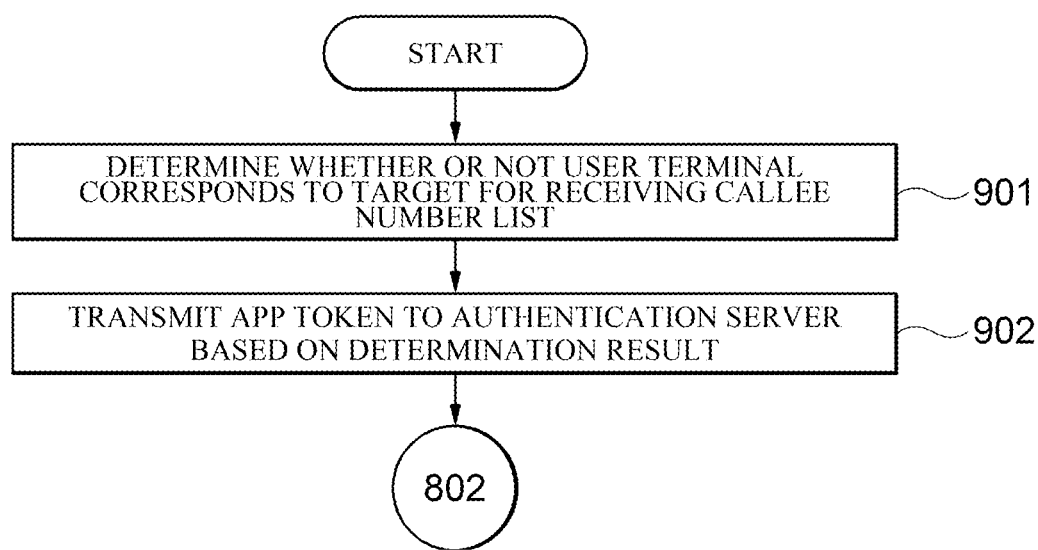
FIG. 9 is a flowchart for describing Step 801 in detail.

FIG. 9 is a flowchart for describing Step 801 in detail.

The authentication method illustrated in FIG. 9 may be performed, for example, by the user terminal 100 described above.

First, the user terminal 100 determines whether or not the user terminal 100 itself corresponds to a target for receiving the callee number list (901).

Thereafter, the user terminal 100 transmits the app token to the authentication server 200 based on the determination result (902).

That is, the user terminal 100 transmits the app token to the authentication server 200 when it is determined that the user terminal 100 corresponds to the target for receiving the callee number list, and does not transmit the app token when it is determined that the user terminal 100 does not correspond to a target for receiving the callee number list.

Figure 10:
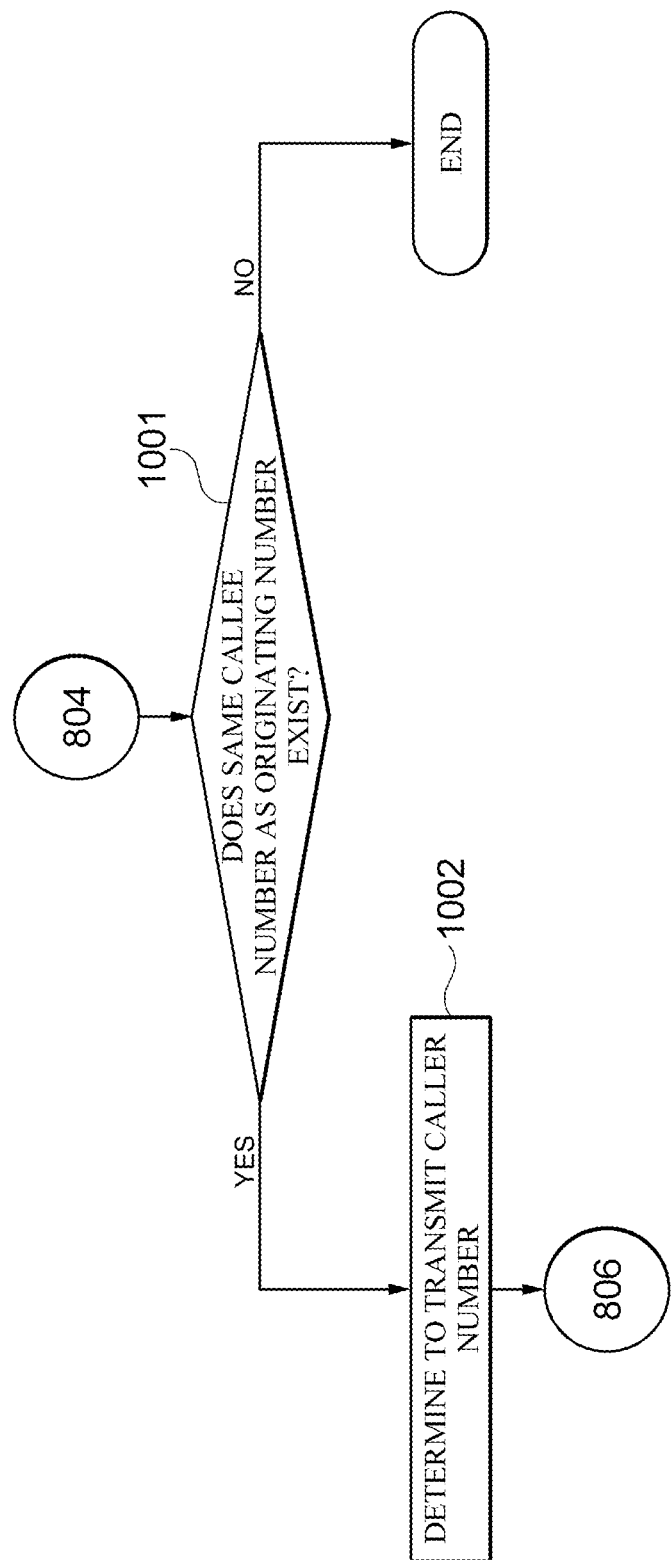
FIG. 10 is a flowchart for describing Step 805 in detail.

FIG. 10 is a flowchart for describing Step 805 in detail.

The authentication method illustrated in FIG. 10 may be performed, for example, by the user terminal 100 described above.

First, the user terminal 100 determines whether or not the same callee number as the originating number exists among one or more callee numbers included in the stored callee number list (1001).

Thereafter, when it is determined that the same callee number as the originating number exists, the user terminal 100 determines itself as an authentication key generation target and determines to transmit the caller number (1002).

On the other hand, when it is determined that the same callee number as the originating number does not exist in the stored callee number list, the user terminal 100 determines that the user terminal 100 itself is not the authentication key generation target.

Figure 11:
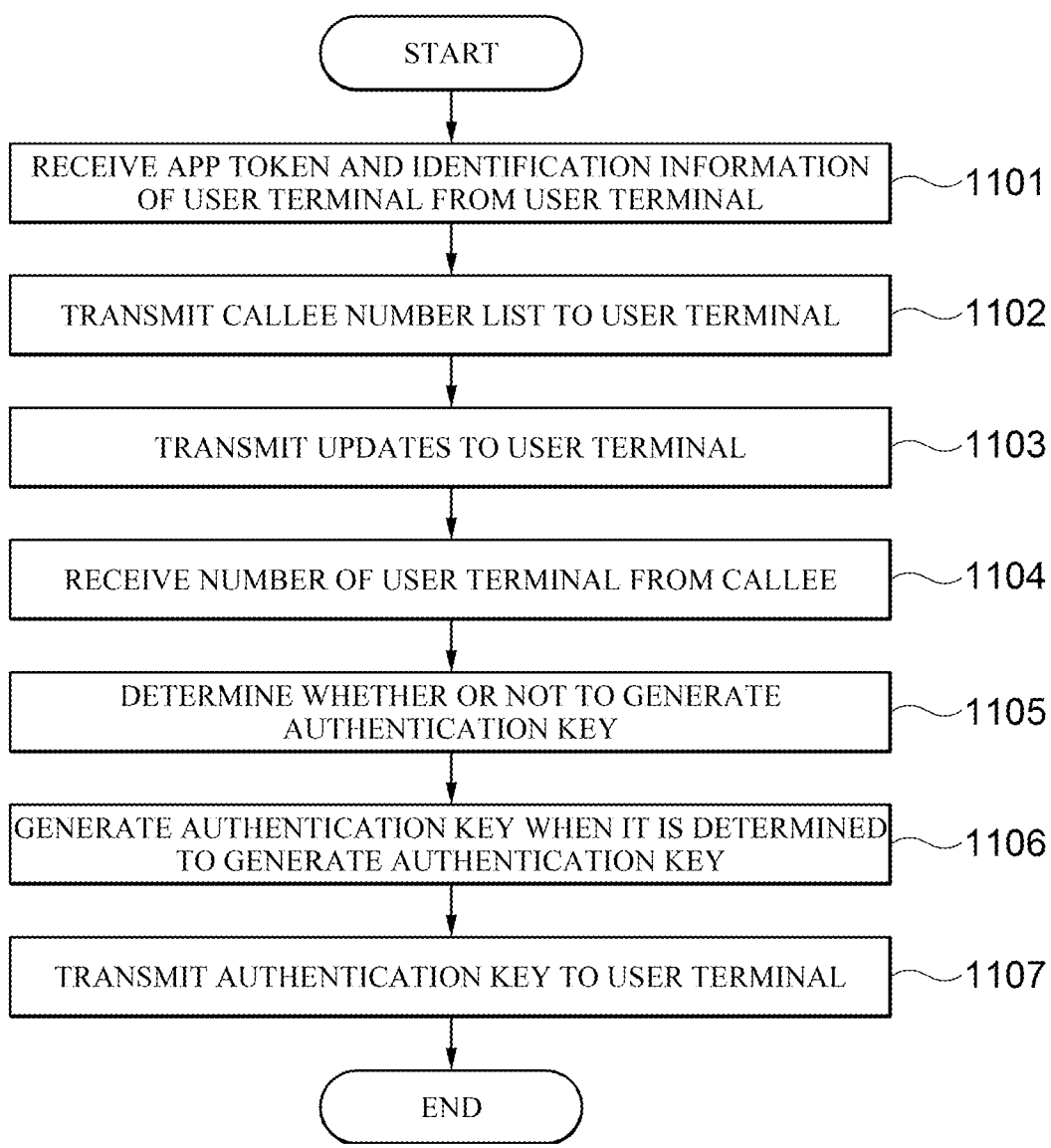
FIG. 11 is a flowchart for describing an authentication method performed by an authentication server according to an embodiment.

FIG. 11 is a flowchart illustrating an authentication method performed by the authentication server according to an embodiment.

The authentication method illustrated in FIG. 11 may be performed, for example, by the authentication server 200 described above.

First, the authentication server 200 receives an app token including identification information of an authentication application previously installed in the user terminal 100 and identification information of the user terminal 100 from the user terminal 100 (1101).

Thereafter, the authentication server 200 transmits the callee number list including one or more preset callee number to the user terminal 100 (1102).

Thereafter, the authentication server 200 transmits updates of the callee number list to the user terminal 100 (1103).

Thereafter, the authentication server 200 receives the number of the user terminal 100 from the callee 300 who has received the call originated from the user terminal 100 (1104).

Thereafter, the authentication server 200 determines whether or not to generate an authentication key based on the number of the user terminal 100 received from the callee 300 and the caller number received from the user terminal 100 (1105).

Thereafter, when it is determined to generate the authentication key, the authentication server 200 generates the authentication key (1106).

Thereafter, the authentication server 200 transmits the authentication key to the user terminal 100 (1107).

Figure 12:
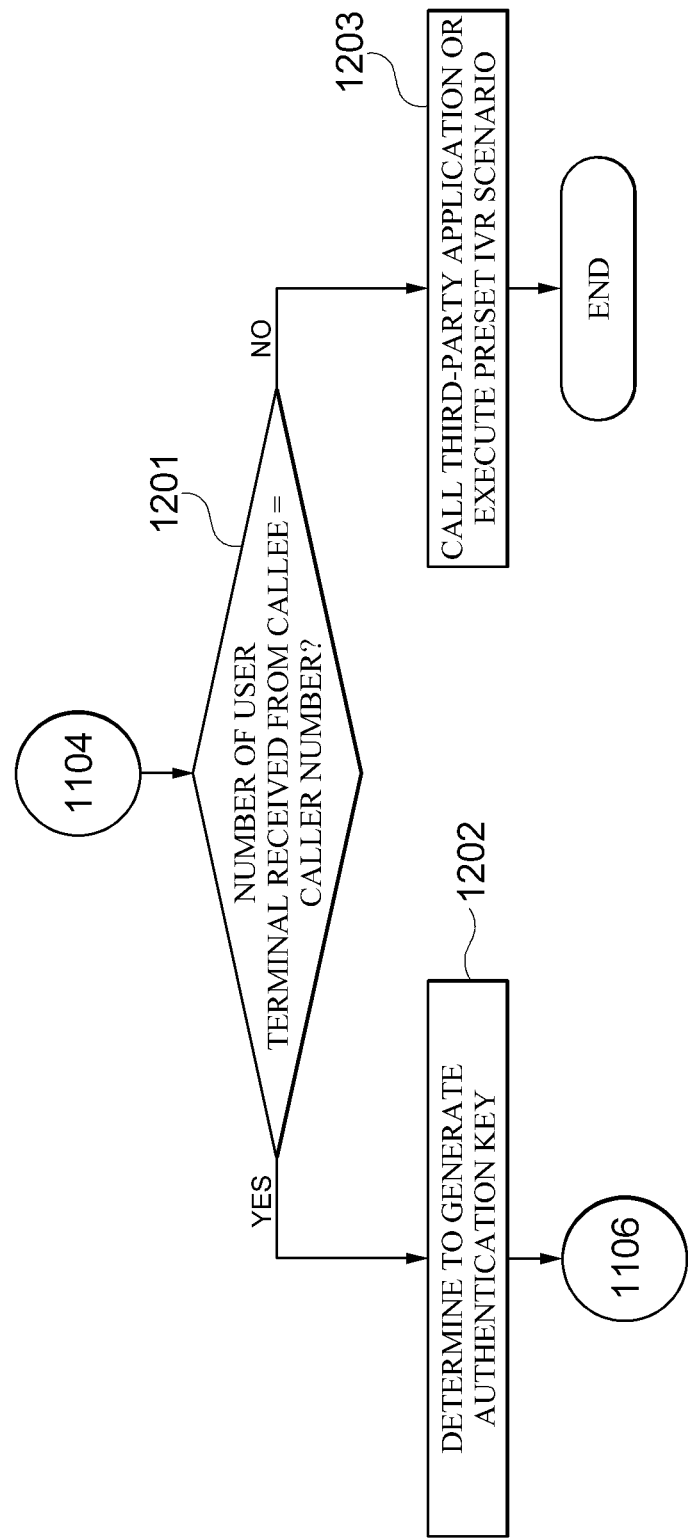
FIG. 12 is a flowchart for describing Step 1105 in detail.

FIG. 12 is a flowchart for describing Step 1105 in detail.

The authentication method illustrated in FIG. 12 may be performed, for example, by the authentication server 200 described above.

First, the authentication server 200 determines whether the number of the user terminal 100 received from the callee 300 and the caller number received from the user terminal 100 match (1201).

Thereafter, when it is determined that the two numbers match, the authentication server 200 determines to generate an authentication key (1202).

On the other hand, when it is determined that the two numbers do not match, the authentication server 200 calls a third-party application related to a service that does not require authentication of the user terminal 100 or causes the user terminal 100 to execute a preset IVR scenario provided by the callee 300.

In the flowcharts illustrated in FIGS. 4 to 12 described above, the method described above is described by dividing the method into a plurality of steps, but at least some of the steps may be performed in a different order, performed together in combination with other steps, omitted, performed by being divided into sub-steps, or performed by being added with one or more steps (not illustrated).

Figure 13:
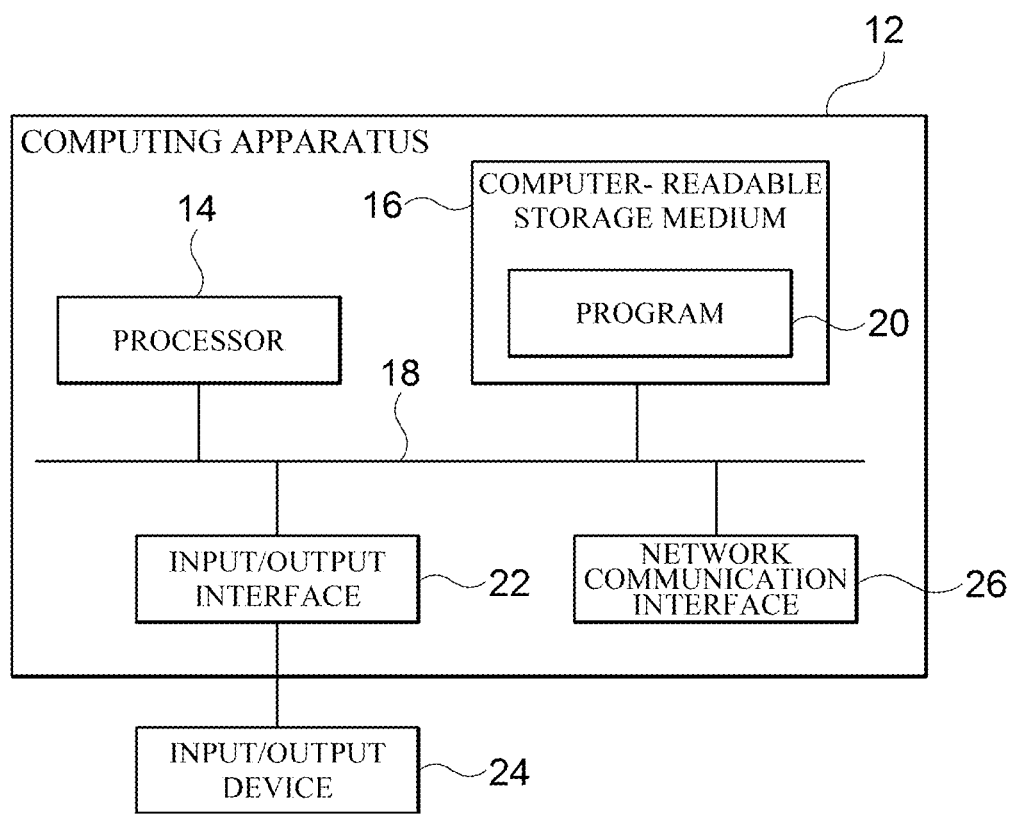
FIG. 13 is a block diagram illustratively describing a computing environment including a computing device according to an embodiment.

FIG. 13 is a block diagram for illustratively describing a computing environment 10 that includes a computing device according to an embodiment.

In the illustrated embodiment, each component may have different functions and capabilities in addition to those described below, and additional components may be included in addition to those described below.

The illustrated computing environment 10 includes a computing device 12. In an embodiment, the computing device 12 may be the user terminal 100. In addition, the computing device 12 may be the authentication server 200.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to the disclosed embodiments, by performing authentication of the terminal with only the callee number stored in each user's terminal, it is possible to significantly reduce the risk of personal information leakage while not having to collect separate personal information including the number of the terminal to be authenticated.

According to the disclosed embodiments, the callee number required for authentication is stored in a storage in each user's terminal rather than a separately prepared server, thereby saving the cost required for server expansion.

Meanwhile, the embodiment of the present invention may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present invention, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured to store and execute program instructions are included. Examples of the program may include a high-level language code that can be executed by a computer using an interpreter, etc., as well as a machine language code generated by a compiler.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A user terminal comprising:
   a storage that stores a callee number list including one or more callee numbers obtained from outside of device;
   a dialer that originates a call to an originating number input from a user;
   a device authentication supporter that determines whether to transmit a caller number based on the originating number and the callee number list, and transmits the caller number to an authentication server when it is determined to transmit the caller number; and
   an authentication key receiver that receives an authentication key from the authentication server and provides the authentication key when the user accesses a service requiring device authentication.

2. The user terminal of claim 1, further comprising:
   a number registration supporter that transmits an app token including identification information of an authentication application previously installed in the device and identification information of the device to the authentication server, and receives the callee number list from the authentication server.

3. The user terminal of claim 2, wherein the number registration supporter determines whether or not the user terminal corresponds to a target for receiving the callee number list, and transmits the app token to the authentication server based on a result of the determination.

4. The user terminal of claim 1, further comprising:
   a number update supporter that receives updates from the authentication server, and updates the callee number list stored in the storage based on the updates.

5. The user terminal of claim 4, wherein the number update supporter receives the updates from the authentication server based on either a push method or a polling method.

6. The user terminal of claim 1, wherein the device authentication supporter determines to transmit the caller number when a same callee number as the originating number exists among one or more callee numbers included in the callee number list.

7. The user terminal of claim 1, the device authentication supporter is included in an authentication application previously installed in the device.

8. A method for authentication performed by a user terminal, comprising:
   storing a callee number list including one or more callee numbers obtained from outside of device;
   originating a call to an originating number input from a user;
   determining whether to transmit a caller number based on the originating number and the callee number list;
   transmitting the caller number to an authentication server when it is determined to transmit the caller number;
   receiving an authentication key from the authentication serve; and
   providing the authentication key when the user accesses a service requiring device authentication.

9. The method of claim 8, further comprising:
   transmitting an app token including identification information of an authentication application previously installed in the device and identification information of the device to the authentication server; and
   receiving the callee number list from the authentication server.

10. The method of claim 9, wherein the transmitting the app token and the identification information of the device includes
    determining whether or not the user terminal corresponds to a target for receiving the callee number list, and
    transmitting the app token to the authentication server based on a result of the determination.

11. The method of claim 8, further comprising:
    receiving updates from the authentication server; and
    updating the callee number list stored in the storage based on the updates.

12. The method of claim 11, wherein, in the receiving the updates, the updates are received from the authentication server based on either a push method or a polling method.

13. The method of claim 8, wherein, in the determining, it is determined to transmit the caller number when a same callee number as the originating number exists among one or more callee numbers included in the callee number list.

14. The method of claim 8, wherein the determining and the transmitting the caller number are performed in an authentication application previously installed in the device.

* * * * *